(12) United States Patent
Hirahara

(10) Patent No.: US 9,058,142 B2
(45) Date of Patent: Jun. 16, 2015

(54) INSPECTING FOR ERRORS IN PRINT DATA AND CONDITIONALLY SAVING THE PRINT DATA DEPENDENT UPON MEMORY SPACE

(75) Inventor: Atsushi Hirahara, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 422 days.

(21) Appl. No.: 12/965,770

(22) Filed: Dec. 10, 2010

(65) Prior Publication Data

US 2011/0255120 A1 Oct. 20, 2011

(30) Foreign Application Priority Data

Apr. 16, 2010 (JP) ................. 2010-095252

(51) Int. Cl.
*G06K 15/02* (2006.01)
*G06F 3/12* (2006.01)

(52) U.S. Cl.
CPC .............. *G06F 3/1279* (2013.01); *G06F 3/121* (2013.01); *G06F 3/1211* (2013.01); *G06F 3/1234* (2013.01); *G06F 3/1244* (2013.01); *G06F 3/1282* (2013.01); *G06K 15/1822* (2013.01); *G06K 15/1861* (2013.01)

(58) Field of Classification Search
None
See application file for complete search history.

(56) References Cited

U.S. PATENT DOCUMENTS

| 2001/0043347 A1* | 11/2001 | Endo et al. ............... 358/1.11 |
| 2002/0080401 A1* | 6/2002 | Abe .......................... 358/1.15 |
| 2006/0153615 A1* | 7/2006 | Kamei ....................... 400/62 |

FOREIGN PATENT DOCUMENTS

| JP | 2001-147792 A | 5/2001 |
| JP | 2001-282497 A | 10/2001 |
| JP | 2002-055789 A | 2/2002 |
| JP | 2002-248814 A | 9/2002 |
| JP | 2005-196679 A | 7/2005 |
| JP | 2005-349828 A | 12/2005 |
| JP | 2007-080269 A | 3/2007 |
| JP | 2008-195021 A | 8/2008 |

OTHER PUBLICATIONS

English translation of IDS (Dec. 10, 2010) reference JP20011282497(A)—Imai Hiroyuki, Printing System, Oct. 2001.*

* cited by examiner

*Primary Examiner* — Eric A Rust
(74) *Attorney, Agent, or Firm* — Canon USA Inc. IP Division

(57) ABSTRACT

An apparatus for printing job data, includes a rendering unit configured to rasterize the job data into bitmap data, a print engine unit configured to print the rasterized job data, and a control unit configured to transmit the job data to the rendering unit, to receive the rasterized job data, to transmit the rasterized job data to the print engine unit. The control unit switches between saving the rasterized job data in a spool space and inspecting the job data without saving the job data to the spool space, depending on free space situation of the spool space.

15 Claims, 13 Drawing Sheets

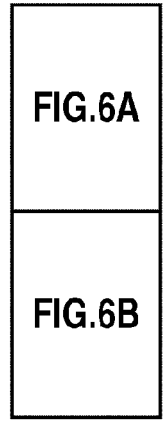
FIG.6A
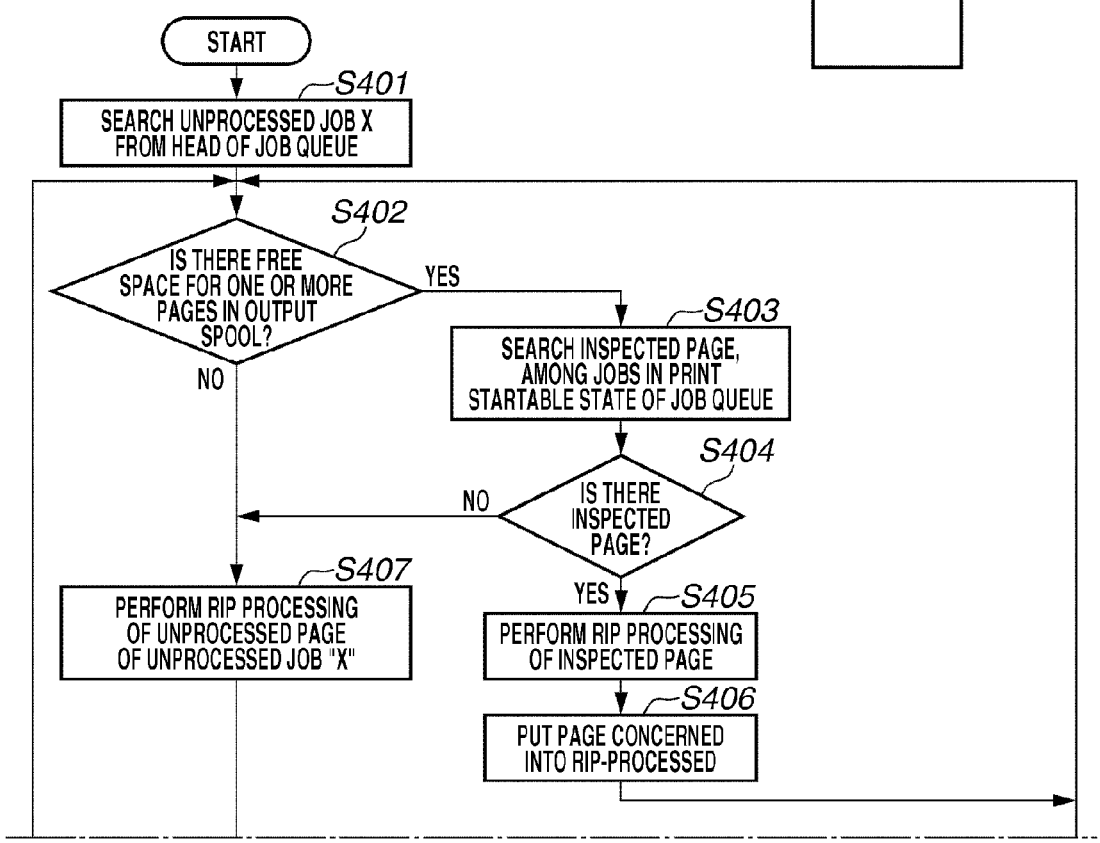

FIG.10

| JOB ID | JOB TYPE | PRINT RESULTS | DETAILS |
|---|---|---|---|
| 00001 | BOOK | PRINT COMPLETED | |
| 00002 | LEAF | PRINT COMPLETED | ERROR PAGES: 3, 8 |
| 00007 | BOOK | CANCEL | ERROR PAGES: 12, 18, 135 |
| 00003 | BOOK | PRINT COMPLETED | |
| 00004 | LEAF | CURRENT PRINTING | |

PRINT HISTORY

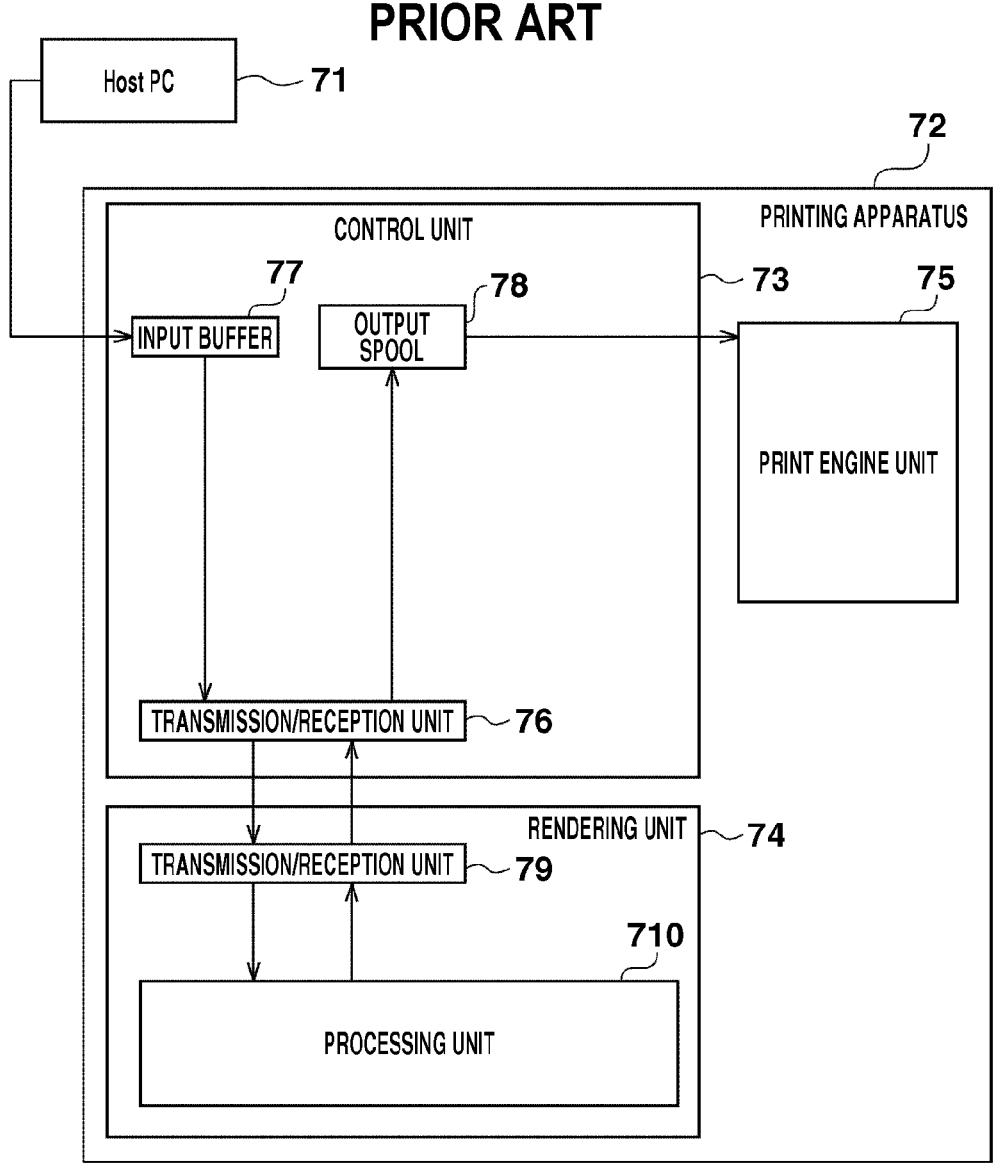

INSPECTING FOR ERRORS IN PRINT DATA AND CONDITIONALLY SAVING THE PRINT DATA DEPENDENT UPON MEMORY SPACE

BACKGROUND OF THE INVENTION

1. Field of the Invention

The present invention relates to a printing apparatus, and a printing method and program.

2. Description of the Related Art

Related art will be described with reference to FIG. 12. FIG. 12 is a block diagram for illustrating a conventional example. A printing apparatus 72 includes a control unit 73, a rendering unit 74, and a print engine unit 75. The control unit 73 includes a transmission/reception unit 76, an input buffer 77, and an output spool 78. The transmission/reception unit 76 controls transmission/reception of data between the control unit 73 and the rendering unit 74. The input buffer 77 temporarily stores job data such as page description language (PDL) including images and documents from a host computer (Host PC) 71. The output spool 78 stores bitmap data converted by the rendering unit 74, and transmits the bitmap data to the print engine unit 75. The print engine unit 75 prints the bitmap data. The rendering unit 74 includes a transmission/reception unit 79 and a processing unit 710. The transmission/reception unit 79 controls transmission/reception of the data between the control unit 73 and the rendering unit 74. The processing unit 710 receives the job data stored in the input buffer 77 via the transmission/reception unit 79, and converts the job data into the bitmap data.

In the above-described conventional configuration, processing time used to convert the job data into the bitmap data is dependent on contents of the job data. Consequently, in order to surely transmit the bitmap data to the print engine unit 75 at a certain interval, the bitmap data after rendering processing is once spooled in the output spool 78 within the control unit 73. Then, at a stage when the bitmap data is gathered by a certain job unit, an operation of transmitting the bitmap data to the print engine unit 75 is performed.

In the printing apparatus with such configuration, there may be portions that are likely to cause format errors of the job data transmitted from external devices or errors of image data contained in the job data, and as a result the rendering processing may fail sometimes. In this case, of course, pages where errors have occurred will not be printed. In order to cope with such situations, there may be provided a step (pre-flight) for making checks for matching (checks of fonts or layouts) using an upstream software that operates on the host computer, before transmitting the data to the printer apparatus.

In Japanese Patent Application Laid-Open No. 2001-282497, error checks are made by the host computer before transmitting data to the printer apparatus, and the results are displayed on the host computer. Thereby error checks equivalent to the pre-flight have become possible.

However, in these configurations, the bitmap data for print of certain job units is spooled from the rendering unit 74, in the output spool 78 within the control unit 73, and accordingly a huge memory capacity is to be used. Since data transmission to the print engine unit 75 cannot be executed during the period until all the bitmap data is gathered, this would be a waste of time, during which the print engine unit 75 is stopped, becomes long and productivity is not increased. In other words, in the conventional technique, it is required to efficiently handle the rendering processing and the engine operation, and to enhance productivity of a printer.

In the case of photo book or the like, unless all pages are correctly printed, they have no commercial value. In such case, if any one of pages is in error, other pages which have been normally printed will be all eventually discarded, and thus commercial materials such as sheets and inks are wasted. In this connection, there is available a means such as a pre-flight in which prior inspection is performed in advance by the host computer as described above. However, there is a matter that error inspection of the job data is not necessarily performed before the data is populated, by depending on a function of an upstream application such as work flow software, or populating uninspected data into a printer by some users. Further, if an upstream step (work flow software) and a rendering processing module within the printer do not match, accurate check cannot be performed. In order to solve the above-described issue, there is a method for transmitting the data to the engine after the rendering of all pages has been completed, when printing of such as photo book is performed. However, in such a case a huge spool space is used, and further a job having a number of pages which exceeds a limited spool space cannot be printed.

SUMMARY OF THE INVENTION

According to an aspect of the present invention, an apparatus for printing job data includes a rendering unit configured to rasterize the job data into bitmap data, a print engine unit configured to print the rasterized job data, and a control unit configured to transmit the job data to the rendering unit, receive the rasterized job data, and transmit the rasterized job data, wherein the control unit switches between saving the rasterized job data in a spool space and inspecting the job data without saving the job data in the spool space, depending on free space situation of the spool space.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 6 (including FIG. 6A and FIG. 6B) is a flowchart illustrating an example of print preparatory processing in the control unit and the like.

FIG. 7 is a flowchart illustrating an example of print processing in the control unit and the like.

FIG. 10 illustrates an example of user interface that presents execution statuses and execution results of jobs.

FIG. 12 is a block diagram for explaining the conventional example.

DESCRIPTION OF THE EMBODIMENTS

Various exemplary embodiments, features, and aspects of the invention will be described in detail below with reference to the drawings.

Figure 1:
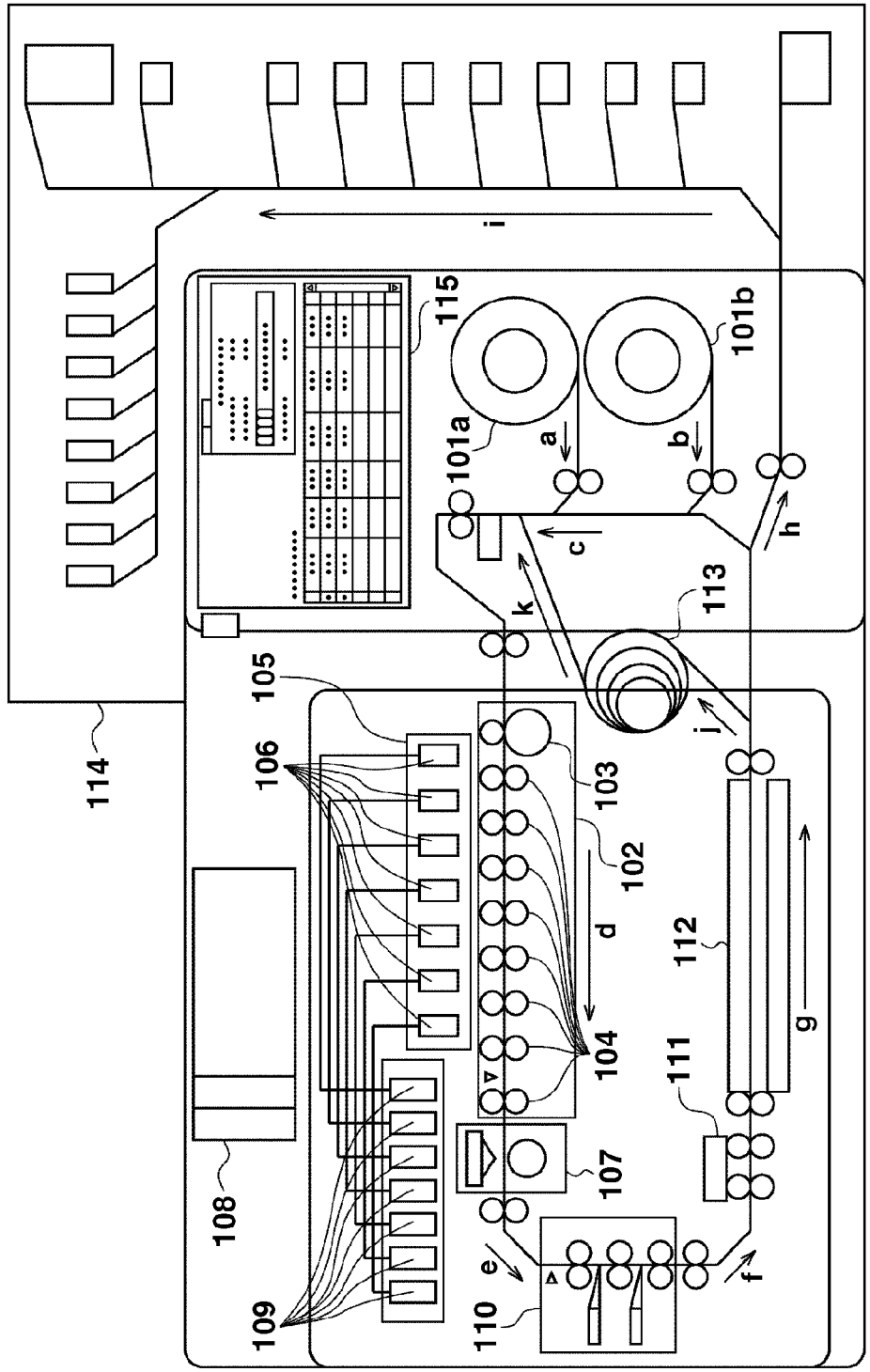
FIG. 1 is a cross-sectional view of general configuration of a printing apparatus using a roll sheet.

FIG. 1 is a cross-sectional view of general configuration of a printing apparatus using a roll sheet (continuous sheet which is continuous and longer than a length of a print unit in a conveyance direction). The printing apparatus is provided with a roll sheet unit 101, a conveyance unit 102, an encoder 103 for conveyance, rotating rollers 104, a head unit 105, printheads 106, a scanner unit 107, a control unit 108, ink tanks 109, and a cutter unit 110. Further, the printing apparatus is provided with a back surface print unit 111, a drying unit 112, a sheet winding unit 113, a sorting unit 114, and an operator unit 115. These are arranged within a housing of the apparatus. The control unit 108 includes built-in control unit provided with a controller and a user interface, various types of input/output (I/O) interfaces, and performs various types of controls of the entire apparatus.

The roll sheet unit 101 is provided with two sets of an upper stage sheet cassette 101a and a lower stage sheet cassette 101b. The user attaches a roll sheet (hereinafter, sheet) to a magazine, and inserts and attaches the magazine from the front into the printing apparatus main body. A sheet pulled out from the upper stage sheet cassette 101a is conveyed in an "a" direction in FIG. 1, and a sheet pulled out from the lower stage sheet cassette 101b is conveyed in a "b" direction in FIG. 1. The sheet from either cassette unit advances in a "c" direction in FIG. 1, and reaches the conveyance unit 102. The conveyance unit 102 conveys the sheet in a "d" direction in FIG. 1 (horizontal direction) during printing through a plurality of rotating rollers 104.

Above the conveyance unit 102, the head unit 105 is arranged opposed thereto. In the head unit 105, the printheads 106 for a plurality of colors (7-color in the exemplary embodiment) are held independently along a conveyance direction of the sheet. In synchronization with a conveyance of the sheet by the conveyance unit 102, inks are ejected from the printheads 106 to form images on the sheet. The print unit is constituted of the conveyance unit 102, the head unit 105, and the printheads 106. The ink tanks 109 store independently inks for respective colors. Inks are supplied by tubes from the ink tanks 109 to sub-tanks provided corresponding to respective colors, and inks are supplied from the sub-tanks to respective printheads 106 through the tubes. The printheads 106 have line heads for respective colors (7-color in the exemplary embodiment) aligned in the "d" direction which is the conveyance direction at the time of printing. The line heads for respective colors may be formed by seamless single nozzle chip, or may be such that nozzle chips are aligned in a regular manner, such as in a line or in a staggered arrangement.

In the present exemplary embodiment, the printheads 106 are full-multi heads, in which nozzles are aligned in a range within which a maximum print width of sheet is covered. As an inkjet method for ejecting inks from the nozzles, a method using heating elements, a method using piezoelectric elements, a method using electrostatic elements, a method using micro-electro-mechanical structures (MEMS) or the like may be adopted. An ink is ejected from the nozzle of each head based on print data, and timing of ejection is determined by an output signal of the encoder 103 for conveyance. The processing according to the present exemplary embodiment is not limited to a printer of the inkjet method, but it can be applied to various print methods such as a thermal printer (sublimation type, thermal transfer type or the like), a dot impact printer, a light-emitting diode (LED) printer, and a laser printer.

After images are formed on a sheet, the sheet is conveyed from the conveyance unit 102 to the scanner unit 107. In the scanner unit 107, it is checked whether there is a problem with the images to be printed by reading out the images to be printed or special patterns. Check of an apparatus status is also performed. In the present exemplary embodiment, as a method for checking images, reading of patterns for checking a status of the heads, or comparing the images with original image may be carried out.

The sheet conveyed from the scanner unit 107 is conveyed in an "e" direction, and is introduced into the cutter unit 110. In the cutter unit 110, the sheet is cut to a predetermined length of each print. The predetermined length of each print is varied depending on an image size to be printed. For example, in an L-type photograph, a length in the conveyance direction is 135 mm, and in an A4 size, a length in the conveyance direction is 297 mm.

The sheet conveyed from the cutter unit 110 is conveyed in an "f" direction in FIG. 1 within the unit, and is conveyed to the back surface print unit 111. The back surface print unit 111 is a unit for printing information for each print image (e.g., a number for order management).

The sheet is conveyed from the back surface print unit 111 to the drying unit 112. The drying unit 112 is a unit for heating with hot air the sheet passing through the unit in a "g" direction in FIG. 1, in order to dry in a short time the sheet on which ink has been applied. The sheet cut to the predetermined length of each print passes through the drying unit 112 one by one, and is conveyed in an "h" direction in FIG. 1 to the sorting unit 114. In the sorting unit 114, the sheet passing through the unit in an "i" direction in FIG. 1 is loaded on a tray number set for each print image, while checking with a sensor. In the sorting unit 114, a plurality of trays is held (e.g., 22 stages in the exemplary embodiment), and the trays, on which the sheets are loaded, are determined depending on a length of each print. Further, the sorting unit 114 performs sorting using a status display such as current loading or loading completed (display with e.g., a light emitting diode (LED)).

When both-sided printing is performed, surface image formation is performed at first, and the sheet is not cut with the cutter unit 110, then the sheet winding unit 113 winds up the sheet passing through the unit in a "j" direction in FIG. 1. The sheet winding unit 113, after all surface image formations have been completed, again conveys the wound-up sheet in a "k" direction in FIG. 1 within the unit, and causes the back surface images to be printed.

With the operator unit 115, an operator performs operation and checks on which tray the designated order images are loaded, or checks print status for each order such as progress or completion of printing, checks apparatus status such as remaining ink amounts, remaining sheet amounts, or performs apparatus maintenance such as head cleaning.

Figure 2:
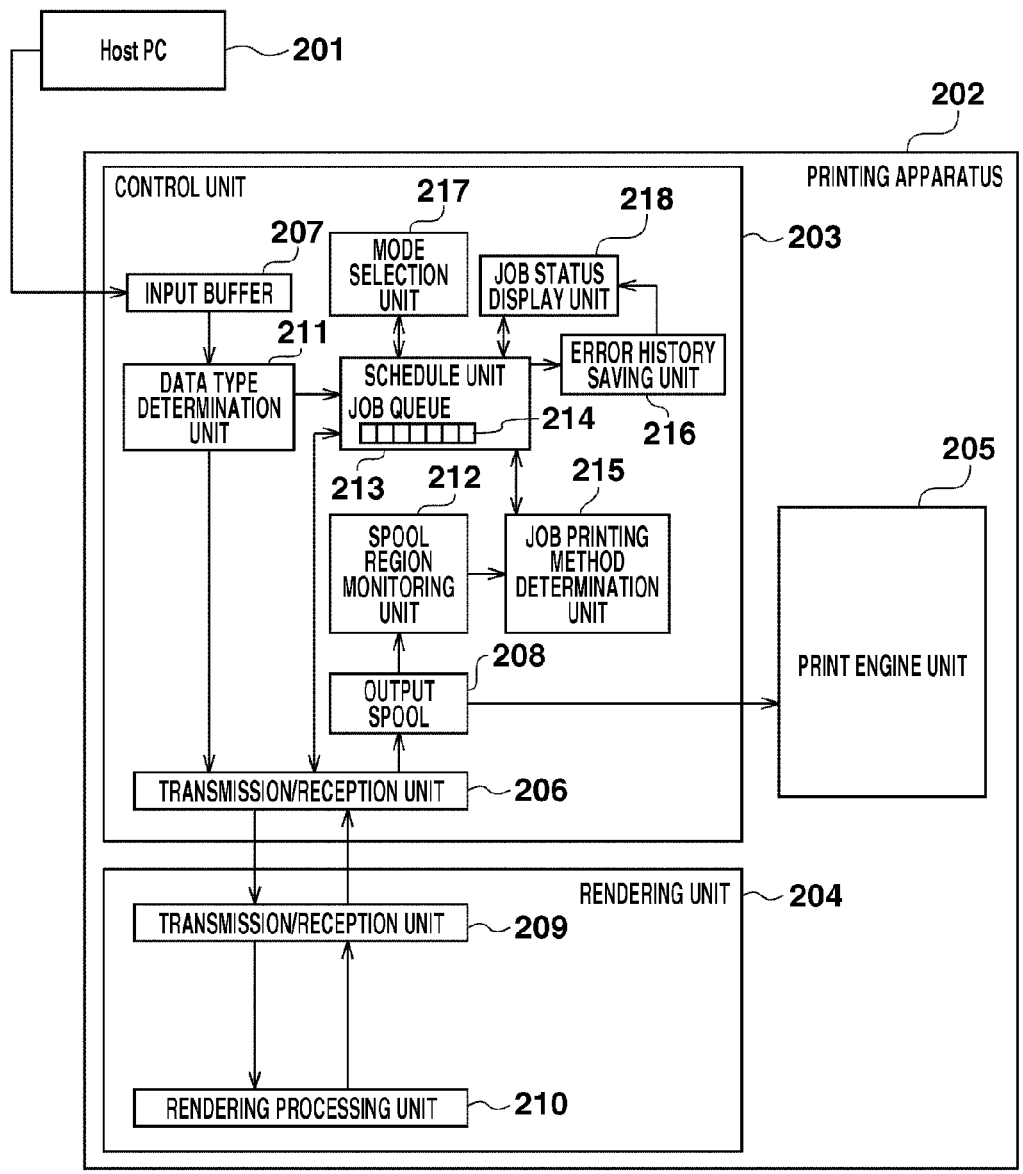
FIG. 2 is a block diagram for explaining a configuration of control in the printing apparatus.

FIG. 2 is a block diagram for explaining a configuration of controls in the printing apparatus. In FIG. 2, a host PC (host computer) 201 is an external computer that transmits job data to the printing apparatus 202.

A rendering unit 204 rasterizes the job data into bitmap data. A print engine unit 205 prints the job data which has been rasterized into the bitmap data by the rendering unit 204. A control unit 203 transmits the job data to the rendering unit 204, receives the job data, which has been rasterized into the bitmap data, from the rendering unit 204, then transmits the job data, which has been rasterized into the bitmap data, to the print engine unit 205.

A transmission/reception unit 206 controls transmission/reception of data between the control unit 203 and the rendering unit 204. The input buffer 207 stores temporarily the job data transmitted from the external host computer 201. An output spool 208 stores the bitmap data to be transmitted to the print engine unit 205 that prints it. The transmission/reception unit 209 controls transmission/reception of data between the rendering unit 204 and the control unit 203. A rendering processing unit 210 performs processing for rasterizing the job data into the bitmap data.

In the present exemplary embodiment, the transmission/reception units 206 and 209 are explicitly shown, to indicate an example in which the control unit 203 and the rendering processing unit 210 are constituted of physically different hardware. However, as another configuration, it is conceivable that the control unit 203 and the rendering processing unit 210 are arranged on the same hardware. In this case, the transmission/reception units 206 and 209 in FIG. 2 may be omitted.

A data type determination unit 211 analyzes the job data retrieved in sequence from the input buffer 207, and determines data type. A spool space monitoring unit 212 monitors free capacity of the output spool 208. A schedule unit 213 performs scheduling of print order of the received job data. A job queue 214 stores print orders of the jobs contained in the schedule unit 213. A job printing method determination unit 215 selects a printing method taking data type, status of the job queue 214, and free spool space into account. An error history saving unit 216, when any error should occur, saves the history (history of error information). A mode selection unit 217 selects a schedule algorithm in the schedule unit 213. A job status display unit 218 displays print results of jobs and error status and the like on the operator unit 115 and the like.

The units 206, 211, 212, 213, 215, 217, 218 and the like, which constitute the control unit 203, may be mounted as hardware such as dedicated integrated circuit. Further, the units 206, 211, 212, 213, 215, 217, 218 and the like may be mounted as software which is realized by a central processing unit (CPU) within the control unit 203 by executing a program stored in a memory or the like within the control unit 203. In similar way, the transmission/reception unit 209 constituting the rendering unit 204 may be mounted as hardware such as dedicated integrated circuit. Further, the transmission/reception unit 209 may be mounted as software realized by the CPU within the rendering unit 204 by executing a program stored in the memory or the like within the rendering unit 204.

Figure 3:
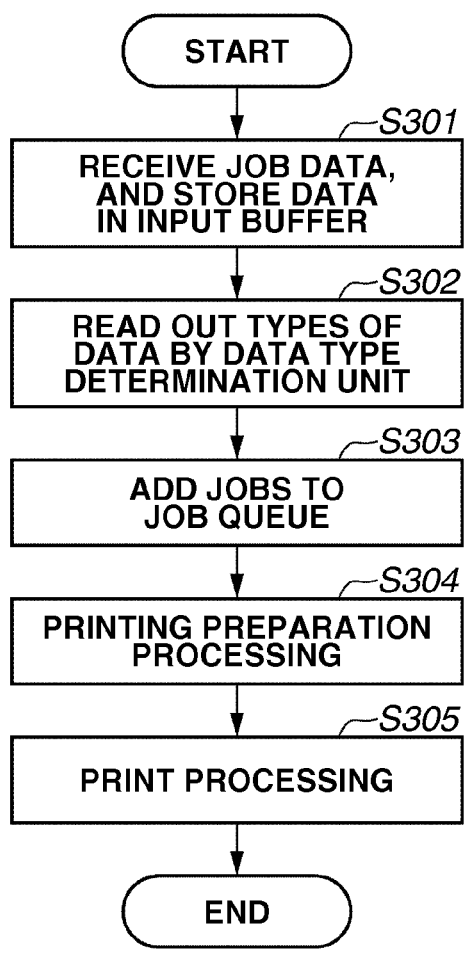
FIG. 3 is a flowchart illustrating an example of print processing.

A flow of print processing in the printing apparatus 202 in the configuration of FIG. 2 will be described with reference to the flowchart illustrated in FIG. 3. FIG. 3 is a flowchart illustrating an example of the print processing.

In step S301, the control unit 203 performs input processing of job data. In the processing, the job data transmitted from the external host computer 201 in FIG. 2, is stored in the input buffer 207. Next, in step S302, the data type determination unit 211 of the control unit 203 reads out types of input job data, and holds them as an attribute of the job. Next, in step S303, the control unit 203 adds an instance of the job, which holds print attributes associated with the job data or information of print data storage region and the like, to the job queue 214. In step S304, the control unit 203 transmits the job data to the rendering processing unit 210 according to orders stored in the job queue 214, to cause the rendering processing unit 210 to perform print preparatory processing to raster the data into the bitmap for print. In step S305, the control unit 203 transmits the data rasterized into bitmap in step S304 to the print engine unit 205, to cause the print engine unit 205 to perform print processing.

Figure 4:
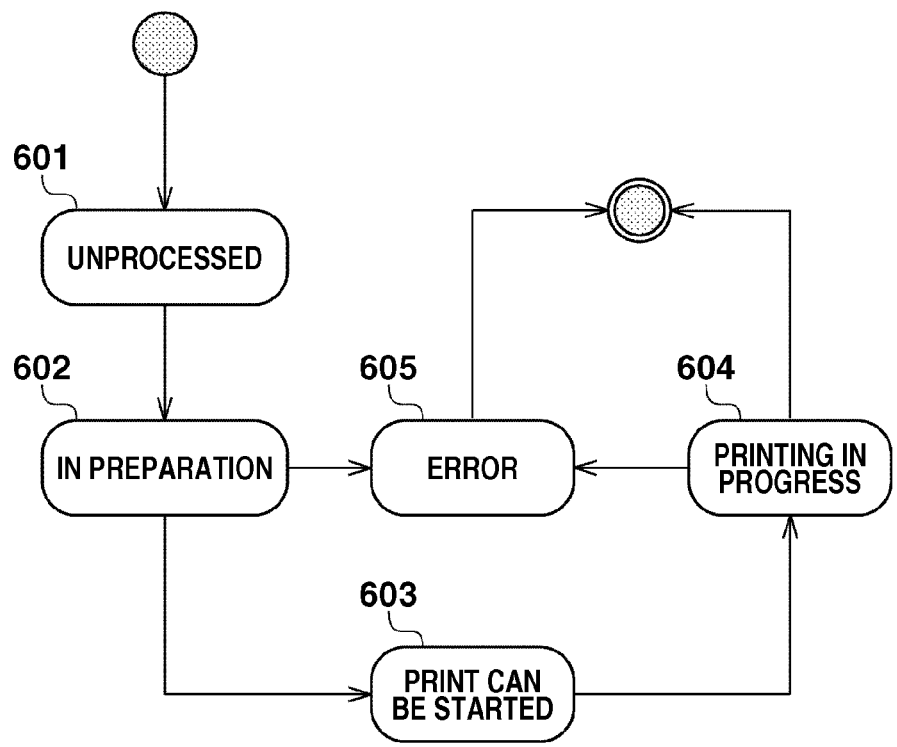
FIG. 4 is a status diagram illustrating an example of statuses of jobs.

Next, an example of a status of a job is illustrated using the status diagram illustrated in FIG. 4. FIG. 4 is a status diagram illustrating an example of status of the job. A state 601 is a state immediately after completion of reception of unprocessed job data, and a state in which any processing has not been performed. A state 602 is a state in which the processing has been performed by the rendering processing unit 210 described above, and a state in progress of print preparation. A state 603 is a state in which print preparation has been completed on all pages of the job, and in a state in which the bitmap data has been transmitted to the print engine unit 205, and printing can be started. A state 604 is a state in which transmission of the data to the print engine unit 205 is started, and printing is being performed. When printing is completed, the state 604 then becomes a completed state. A state 605 is a state to which the process is shifted in case of occurrence of an error which makes continuation of print processing impossible, when either printing is in preparation or in progress. When deletion or interruption processing of the job is performed, the process becomes a termination state. In this process, error includes, for example, a failure in analysis of print data in the rendering processing unit 210, or hardware failure of the print engine unit 205.

Figure 5:
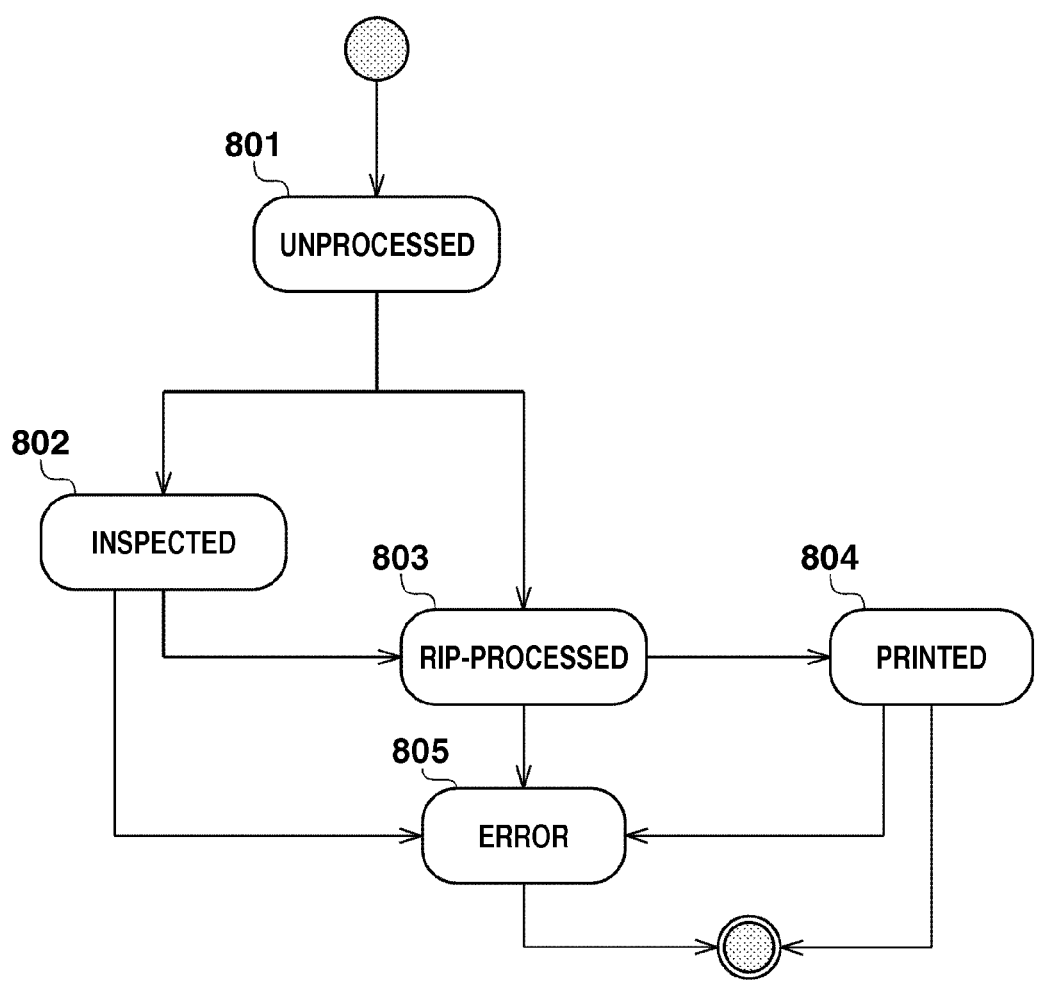
FIG. 5 is a status diagram illustrating an example of statuses of pages included in a job.

Next, an example of a status of pages included in a job is illustrated in FIG. 5. FIG. 5 is a status diagram illustrating an example of pages included in the job. One or more pages are included in the job, and each page is assumed to have independent state. A state 801 is a state in which no processing has been performed on pages. A state 802 is a state in which bitmap rasterization processing (hereinafter, referred to as a raster image processing (RIP), or RIP-processing) has been performed in the rendering processing unit 210, and it is confirmed that no errors have occurred, and the bitmap data is not held in the output spool 208. A state 803 is a state in which the RIP-processing has been completed in the rendering processing unit 210, and the bitmap data is saved in the output spool 208. The state 803 may shift by way of the state 802, or may shift directly from the state 801. A state 804 is a state in which the RIP-processed data has been transmitted to the print engine unit 205. A state 805 is an error state. The process shifts, when any error has occurred, from the state 802, the state 803, or the state 804 to the state 805. In this process, error includes, for example, a failure in analysis of print data in the rendering processing unit 210, or hardware failure of the print engine unit 205.

Figure 6B:
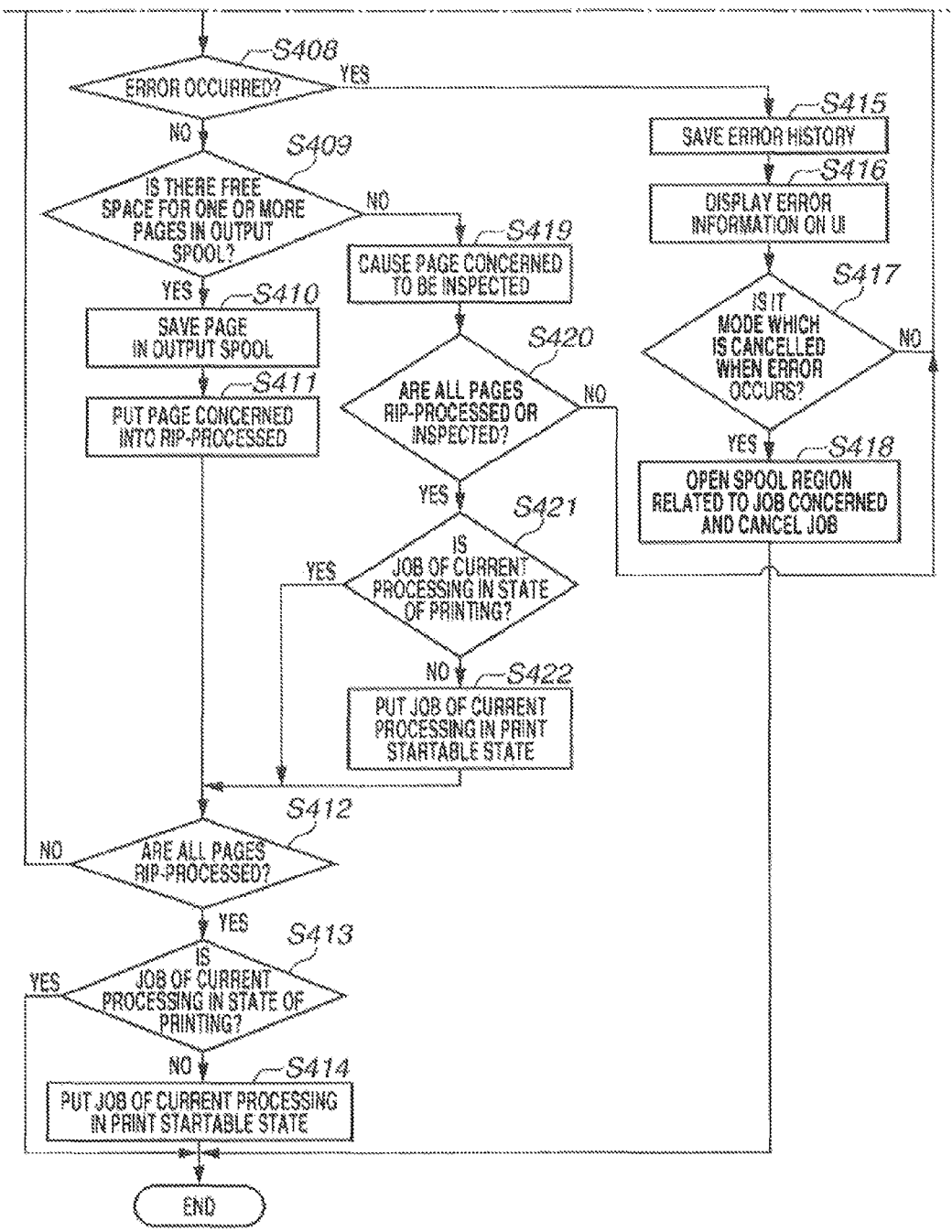

Next, a flow of print preparatory processing in the control unit 203 and the like will be described with reference to the processing flow illustrated in FIG. 6 (including FIG. 6A and FIG. 6B). FIG. 6 is a flowchart illustrating an example of the print preparatory processing in the control unit 203 and the like.

In step S401, the schedule unit 213 searches jobs of the unprocessed state 601 in which print preparatory processing has not yet been executed, from an instance of the jobs stored in the job queue 214, and chooses the oldest job among them.

In step S402, the spool space monitoring unit 212 checks whether there is free space available in the output spool 208, and if there is no free space (NO in step S402), then advances the processing to step S407. On the other hand, if there is free space (YES in step S402), the spool space monitoring unit 212 advances the processing to step S403.

In step S403, the schedule unit 213 searches pages of which bitmap is not stored in the output spool 208, although it is confirmed to be the inspected pages, that is, RIP-available pages, among printable-state jobs stored in the job queue 214. Search for pages is performed in the order of printing, and if there is a plurality of printable-state jobs, a job to be printed earlier becomes search target.

In step S404, the schedule unit 213 checks whether inspected pages have been found, and if found (YES in step S404), then advances the processing to step S405. On the other hand, if not found (NO in step S404), the schedule unit 213 advances the processing to step S407.

In step S405, the rendering processing unit 210 performs RIP-processing of the found inspected pages. The transmission/reception unit 206 stores the bitmap data after RIP-processing has been performed, in the free space of the output spool 208 found in step S402.

In step S406, the rendering processing unit 210 puts a status of pages into RIP-processed. Next, the control unit 203 and the like returns to step S402, and repeats similar processing until there is no free space in the output spool 208 or no inspected pages are left.

In step S407, the rendering processing unit 210 performs RIP-processing of the pages which have not been yet RIP-processed, out of the pages, which are retained by Job "X" selected in step S401.

In step S408, the schedule unit 213 checks whether analysis error or the like of data has occurred in the course of step S407, and if the error has not occurred (NO in step S408), advances the processing to step S409.

In step S409, the spool space monitoring unit 212 checks whether there is free space available in the output spool 208, and if there is free space available (YES in step S409), then advances the processing to step S410. On the other hand, if there is no free space (NO in step S409), the spool space monitoring unit 212 advances the processing to step S419.

In step S410, the transmission/reception unit 206 saves the bitmap data after the RIP-processing is performed in step S407, in the output spool 208.

In step S411, the schedule unit 213 puts the pages concerned into the RIP-processed state.

In step S412, the schedule unit 213 checks whether all pages of the selected job "X" have been RIP-processed. If all pages have been RIP-processed (YES in step S412), the schedule unit 213 advances the processing to step S413. On the other hand, if there are one or more RIP-unprocessed pages (NO in step S412), the schedule unit 213 returns the processing to step S402. The control unit 203 and the like, hereinbelow, repeat similar processing routines.

In step S413, the schedule unit 213 checks whether a state of the selected job is in progress of printing. If printing is in progress (NO in step S413), the schedule unit 213 advances the processing to step S414.

In step S414, the schedule unit 213 changes a state of the selected job to print startable state, and terminates the print preparatory processing. In step S408, the schedule unit 213, when detecting an error of page (YES in step S408), advances the processing to step S415.

In step S415, the schedule unit 213 records errors that occurred and job identifications (IDs) that appeared, in the error history saving unit 216.

In step S416, the job status display unit 218 displays values saved in the error history saving unit 216 on the user interface (UI) (screen).

In step S417, the schedule unit 213 checks whether a print mode for each job type described below is a mode to be cancelled when error occurs. If the mode is to be cancelled (YES in step S417), then the schedule unit 213 advances the processing to step S418.

In step S418, the schedule unit 213 and the like perform processing concerning deletion of a job in which an error has occurred. More specifically, the schedule unit 213 and the like open resources concerning the job, such as deletion of a spool space of the job of the output spool 208, deletion of job instance from the job queue 214. On the other hand, in step S417, if it is not determined as the mode to be cancelled when the error occurs (NO in step S417), the schedule unit 213 returns the processing to step S402. The control unit 203 and the like, hereinbelow, repeat similar processing. In this case, only pages in which the error has occurred will be deleted. On the other hand, in step S409, if it is determined that there is no free space in the output spool (NO in step S409), then the spool space monitoring unit 212 advances the processing to step S419.

In step S419, the schedule unit 213 puts the concerned page into the inspected one. In the processing in this step, the bitmap data is not saved.

Then, in step S420, the schedule unit 213 checks whether all pages of the selected job "X" have been RIP-processed or inspected. In this case, the RIP-processed pages and inspected pages may be mixed in the job "X". If there are unprocessed (neither RIP-processed nor inspected) pages (NO in step S420), then the schedule unit 213 returns the processing to step S402. The control unit 203 and the like, hereinbelow, repeat the similar processing. On the other hand, if all pages have been RIP-processed or inspected (YES in step S420), the schedule unit 213 advances the processing to step S421.

In step S421, the schedule unit 213 checks whether a state of the current selecting job is printing in progress. If not the printing in progress (NO in step S421), then the schedule unit 213 advances the processing to step S422. On the other hand, if the current printing (YES in step S421), the schedule unit 213 returns the processing to step S412 described above.

In step S422, the schedule unit 213 changes a state of the selected job to a printable state. Next, upon returning to step S412, the schedule unit 213, thereafter, repeats the similar processing. However, in this case, since a state of the job has already become printable state, the schedule unit 213 operates in parallel, and the data is sequentially transmitted to the print engine unit 205 by the print processing flow described below. The data transmitted to the print engine unit 205 is deleted from the output spool 208. Therefore, free space is created in the output spool 208, so that the RIP-processing becomes possible in the processing in step S402 and afterward. The inspected and RIP-unprocessed pages will be RIP-processed in sequence. When all pages become RIP-processed, the processing proceeds to step S412, step S413, and step S414 described above, and print preparatory sequence is terminated.

Figure 7:
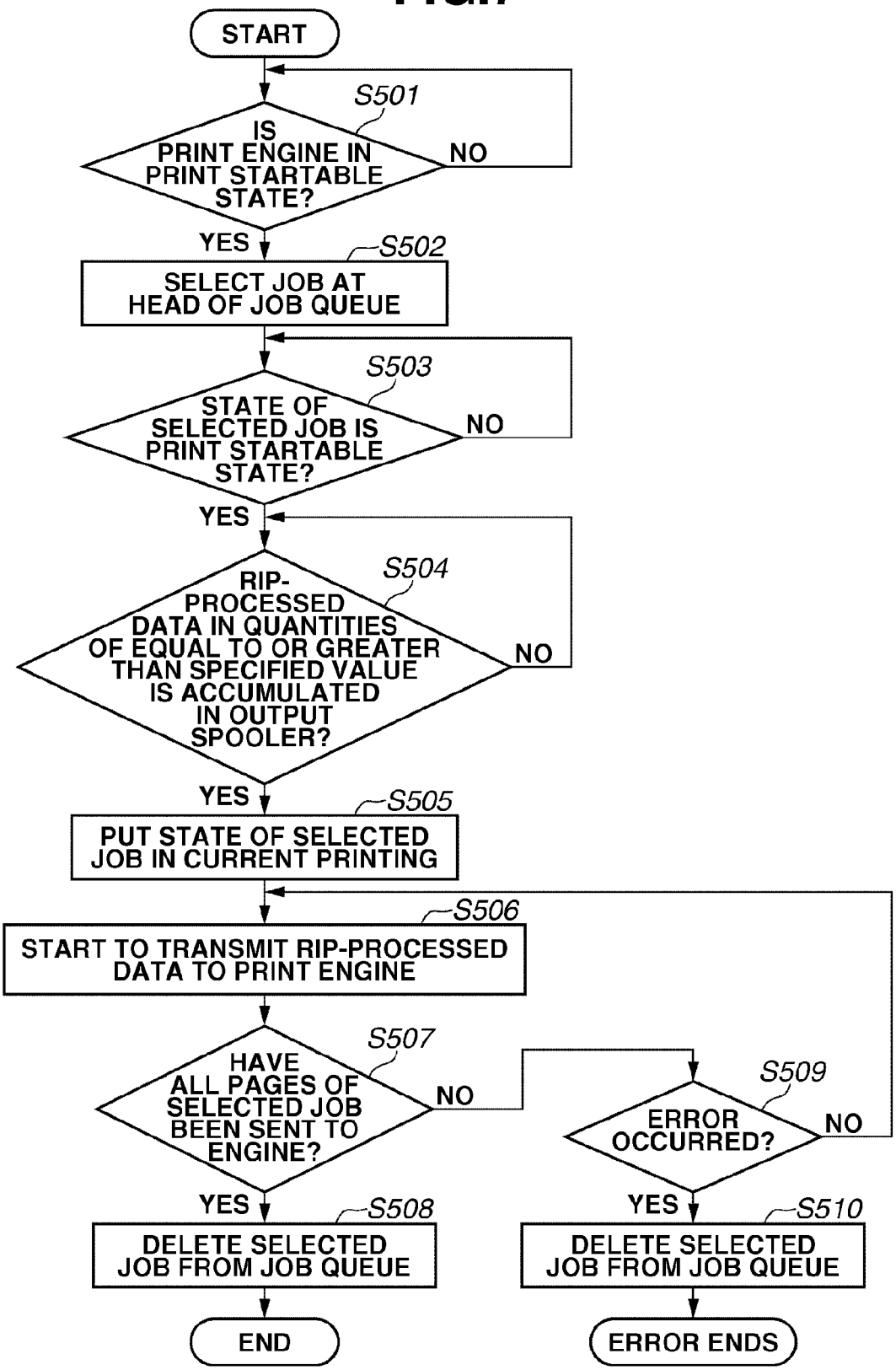

Next, with reference to the processing flow illustrated in FIG. 7, a flow of print processing in the control unit 203 and the like will be described. FIG. 7 is a flowchart illustrating an example of the print processing in the control unit 203 and the like.

In step S501, the schedule unit 213 checks whether a start-up processing of the print engine unit 205 has been completed and the job has become printable. If the job has become printable (YES in step S501), the schedule unit 213 advances the processing to the next step S502.

In step S502, the schedule unit 213 selects, among the jobs which are being queued by the job queue 214, the one at the head.

Next in step S503, the schedule unit 213 checks whether a state of the selected job is the print startable state. If the state has become print startable (YES in step S503), then the schedule unit 213 advances the processing to the next step S504.

In step S504, the spool space monitoring unit 212 surveys whether a number of RIP-processed data equal to or greater than a specified value set in advance in the output spool 208 is accumulated. If is the number of data is only less than the specified value (NO instep S504), the spool space monitoring unit 212 waits the processing until the number of the RIP-processed data equal to or greater than the specified value is accumulated. On the other hand, if the number of the RIP-processed data in excess of the specified value is accumulated (YES in step S504), then the spool space monitoring unit 212 advances the processing to step S505.

In step S505, the schedule unit 213 changes a state of the job to current printing. Then, in step S506, the control unit 203 starts transmitting the RIP-processed data to the print engine unit 205.

In step S507, the schedule unit 213 checks whether all pages of the selected jobs have been transmitted to the print engine unit 205. If there is untransmitted data (NO in step S507), then the schedule unit 213 advances the processing to step S509, and check whether an error has occurred. On the other hand, if an error has not occurred (NO in step S509), then the schedule unit 213 returns the processing to step S506, and causes the processing to continue. If an error has occurred (YES in step S509), the schedule unit 213 advances the processing to step S510. Then, the schedule unit 213 deletes the selected job from the job queue 214 and opens all resources such as spool space or the like of the output spool 208 which the concerned job used, and terminates the error. In step S507, if transmission of all data is has been completed (YES in step S507), then the schedule unit 213 advances the processing to step S508.

In step S508, the schedule unit 213 deletes the selected job from the job queue 214, opens all resources such as spool space or the like of the output spool 208, which concerned the job used, and terminates a series of print processing.

Figure 8:
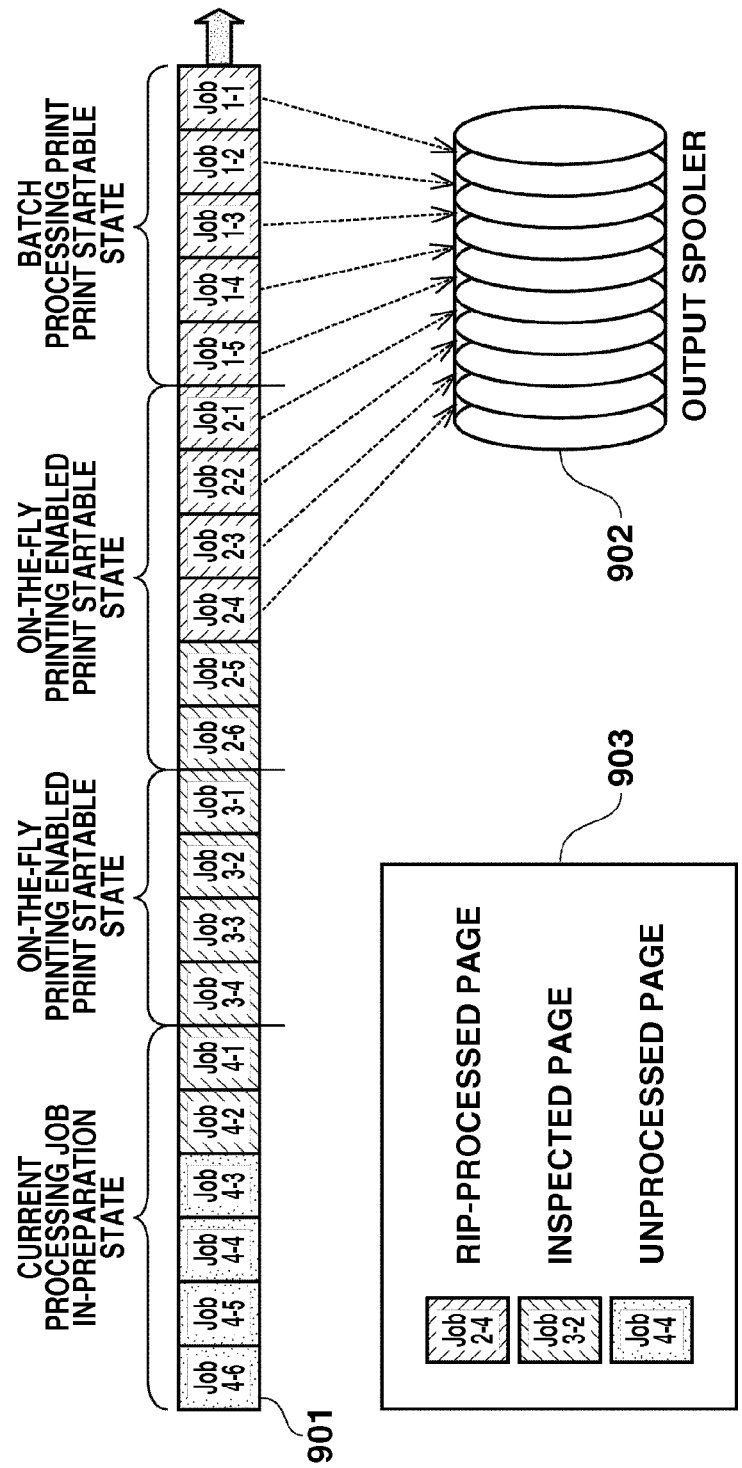
FIG. 8 is a diagram for explaining an example of jobs and page processing in print preparatory operation.

Next, with reference to FIG. 8, an example of jobs and page processing in print preparatory operation will be described. FIG. 8 is a diagram for explaining an example of jobs and page processing in the print preparatory operation. In FIG. 8, a rectangle written as "Job 2-4" represent a state of $4^{th}$ page included in the job with a job number 2. Rectangles illustrated in an example 903 in FIG. 8 each represent "RIP-processed page", "inspected page", and "unprocessed page". An example 901 represents diagrammatically the job queue 214 in which a plurality of jobs is populated and states of pages included in respective jobs. Pages at right side of the example 901 are first transmitted to the print engine unit 205, and printed. An example 902 illustrates relationship between pages and storage regions of their RIP-processed bitmap data in an output spooler (the output spool 208) with dashed line arrows. In this example, all pages (1 to 5) of a job 1 have been RIP-processed, and a state of the job is put into "print startable state" by the processing illustrated in FIG. 6. Further, pages 1 to 4 of a job 2 have been RIP-processed. However, since there is no free space in the output spooler (the output spool 208), fifth and sixth pages have not been RIP-processed, but are in the inspected state. The job 2 of this example is in the "print startable state". Since all pages of a job 3 have been inspected, they will be similarly in the "print startable state". On the other hand, as for a job 4, only first and second pages have been inspected, but the remaining pages (3 to 6) remain unprocessed. In such case, a state of the job 4 is treated as "in-preparation state".

In the example of FIG. 8, no errors of pages are detected, and when the print engine unit 205 is in the printable state, transmission of the RIP-processed data is immediately started. Further, only after RIP-processing of all pages has been completed, the job 1 becomes print startable. A print scheme of such job is called batch processing print. On the other hand, the job 2 and job 3 are not in a state in which the RIP-processing of all pages has been completed, but is in a state in which at least inspection of all pages has been completed, and printing of the RIP-processed data can be performed in good order from. The print in such job is called on-the-fly print. If the processing of the present exemplary embodiment is not performed, the Job 2 and Job 3 will not become print startable. This may become a problem in terms of throughput.

Figure 9:
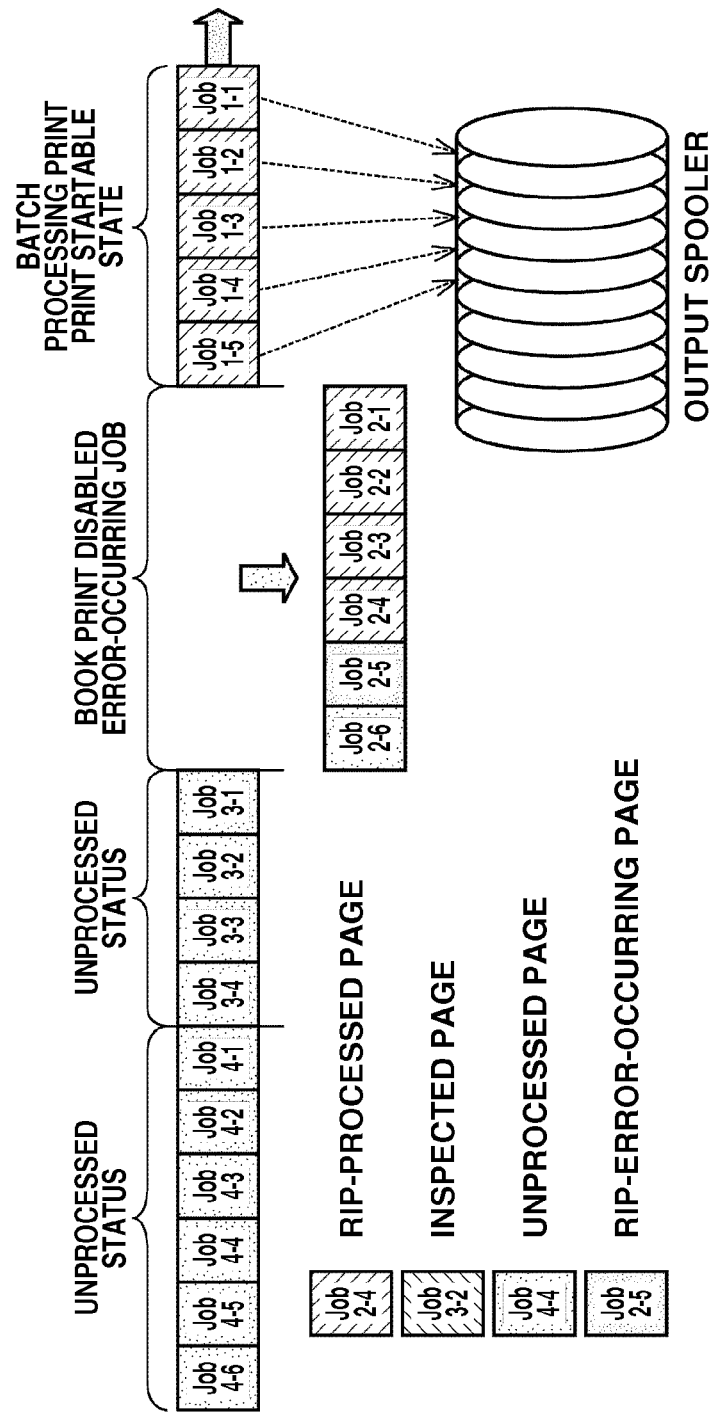
FIG. 9 is a diagram for explaining an example of jobs and page processing in print preparatory operation when error pages are detected.

Moreover, an example of jobs and page processing in print preparatory operation at the time when error pages are detected will be described with reference to FIG. 9. FIG. 9 is a diagram for explaining an example of jobs and page processing in the print preparatory operation at the time when error pages are detected. This example indicates a state of failure (RIP-error occurred) in analysis of fifth page of the job 2, wherein the job 2 is canceled and deleted from the job queue 214, and page data (1 to 4), which have been RIP-processed before then, are also deleted from the output spooler (the output spool 208). In this example, inspection of sixth page and afterward is not yet performed, but a sixth page of the job 2 and afterward may also continue to be inspected, and the job is canceled after surveying whether errors are included in the remaining pages and after keeping a history thereof. The RIP-processing of the job 3 and jobs following after deleting the job 2 will be continued.

FIG. 10 illustrates an example of user interface for presenting execution statuses and execution results of jobs. The user interface (screen) of FIG. 10 is displayed by the job status display unit 218. This example includes items such as job IDs, job types, print results, and detailed information. The items illustrated herein are only an example, and other pieces of information (job reception time and information of sheets) held as job information may be displayed. However, since these pieces of information are not essential in the present exemplary embodiment, they will be omitted herein. The job status display unit 218 displays information of the jobs according to statuses of the job queue 214 managed by the schedule unit 213, and error history saved by the error history saving unit 216. Job types are pieces of information determined by the data type determination unit 211, and indicate types of populated jobs such as "book" indicating photo book, and "leaf" indicating a job like print of photos of a digital camera. A column of print results indicates statuses of current jobs or print results, and displays a case where print has been normally completed, a case where print has been canceled, and a case in current printing and the like. In a column of details, numbers of pages in which errors occurred are listed. This example indicates that errors occurred at page 3 and page 8 of the job with Job ID=00002 and job type of "leaf". Further, this example indicates that errors occurred at page 12, page 18, and page 135 of the job of with Job ID=00007 and job type of "book". The Job status display unit 218 collects mainly information of such error pages from the error history saving unit 216.

The job with Job ID=00007 is canceled since error pages are detected. On the other hand, the job with Job ID=00002 is print-completed, although error pages are detected. This is because different behavior is set for each job type, when error pages are detected. For example, in case of leaf print of digital camera photos, even when there are pages that cannot be printed in the job, they have meaning as a print of photos. In case of printing matter like photo book, however, if pages halfway through the job cannot be printed due to errors, value as a whole will be eventually lost. For this reason, it is convenient that behavior is varied depending on job type when errors are detected.

Figure 11:
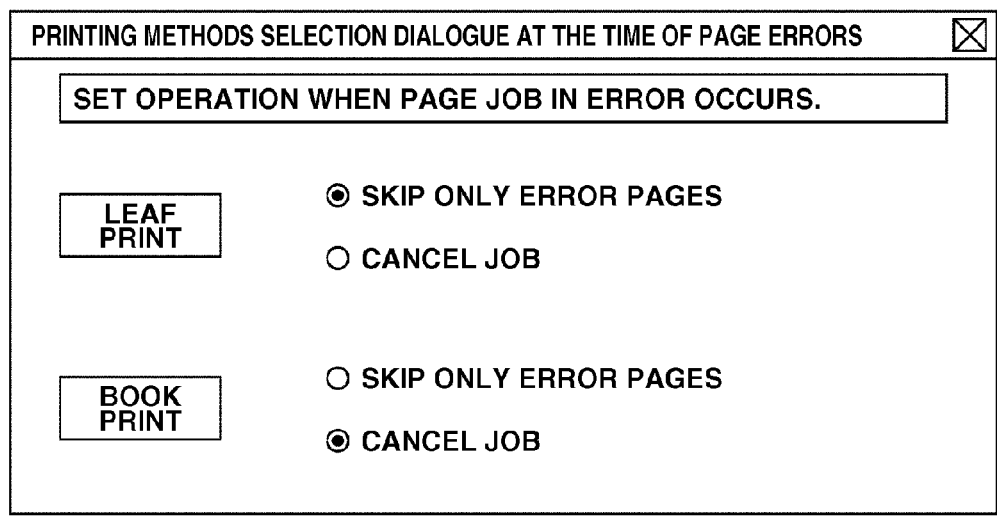
FIG. 11 illustrates an example of user interface (UI) for setting a mode at the time when error pages are detected by job type.

FIG. 11 illustrates an example of UI for setting a mode (behavior) when error pages are detected, by job type. Via a screen of FIG. 11, a user is allowed to choose for each job type, a mode for continuing printing while skipping only error pages and, or a mode for canceling the job without printing all pages. In other words, the mode selection unit 217 selects for each job type, a mode for continuing printing while skipping only error pages, or a mode for canceling the job without printing all pages, based on user operation via the screen illustrated in FIG. 11. In this example, two different types of leaf print and book print are illustrated by an example, but the present invention is not limited thereto.

According to the present exemplary embodiment, by inspecting a print job that contains data that leads to errors within the control unit 203, before start of printing, time and waste of commercial materials can be saved without performing useless printing. According to the present exemplary embodiment, by performing inspection of the job in advance, sequential printing with higher throughput can be performed. According to the present exemplary embodiment, even when many jobs are populated, it is possible to detect errors of a job and notify the user, before print sequence comes along. In the present exemplary embodiment, a "printing apparatus" is not limited to a machine dedicated to a printing function, but includes multifunction peripheral combining printing function and other functions, and production apparatus or the like for forming images and patterns on recording sheets or the like.

Other Exemplary Embodiments

Further, the present invention is also realized by executing the following processing. More specifically, the present invention is also realized by executing the processing for supplying software (program) that implements the above-described functions of the exemplary embodiments, to a system or apparatus, via a network or various types of computer readable storage mediums, and by causing a computer (or a CPU or a micro-processing unit (MPU), and/or the like) of the system or apparatus to read out and execute the program.

According to the exemplary embodiments described above, printing with higher throughput can be performed using a limited spool space.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-095252 filed Apr. 16, 2010, which is hereby incorporated by reference herein in its entirety.

What is claimed is:

1. An apparatus comprising:
a rendering unit configured to rasterize a page of job data into bitmap data if there is no free space for one or more pages in a spool space, or if there is no inspected page, or if there is free space for one or more pages in the spool space and there is an inspected page;
a print engine unit configured to print the rasterized page; and
a control unit configured to transmit the job data to the rendering unit, receive the rasterized page, and transmit the rasterized page to the print engine unit,
wherein, in a case when there is no error in rasterizing the page, the control unit saves the rasterized page in the spool space when there is free space for one or more pages in the spool space, and sets the page as an inspected page without saving the rasterized page in the spool space when there is no free space for one or more pages in the spool space.

2. The apparatus according to claim 1, wherein the control unit switches between canceling printing depending on type of the job data, and continuing printing while skipping processing of only error pages, if error pages are detected from among the job data.

3. The apparatus according to claim 1, further comprising:
a setting unit configured to set an operation when error pages are detected from among the job data, depending on type of the job data, based on user operation via a screen,
wherein the control unit, if error pages are detected, executes the set operation.

4. The apparatus according to claim 1, wherein the control unit, if error pages are detected from among the job data, saves error information.

5. The apparatus according to claim 1, wherein the control unit, if error pages are detected from among the job data, displays error information on a screen.

6. A method comprising:
rasterizing a page of job data into bitmap data by a rendering unit if there is no free space for one or more pages in a spool space, or if there is no inspected page, or if there is free space for one or more pages in the spool space and there is an inspected page;
printing the rasterized page by a print engine unit; and
transmitting the job data to the rendering unit, receiving rasterized page, transmitting the rasterized page to the print engine unit, by a control unit,
wherein, in a case when there is no error in rasterizing the page, the control unit saves the rasterized page in the spool space when there is free space for one or more pages in the spool space, and sets the page as an inspected page without saving the rasterized page in the spool space when there is no free space for one or more pages in the spool space.

7. The method according to claim 6, further comprising switching between canceling printing depending on type of the job data, and continuing printing while skipping processing of only error pages, if error pages are detected from among the job data.

8. The method according to claim 6, further comprising:
setting an operation when error pages are detected from among the job data, depending on type of the job data, based on user operation via a screen; and
executing the set operation if error pages are detected.

9. The method according to claim 6, further comprising saving error information if error pages are detected from among the job data.

10. The method according to claim 6, further comprising displaying error information on a screen if error pages are detected from among the job data.

11. A non-transitory computer readable storage medium storing a computer-executable program of instructions for causing a computer to perform the method according to claim 6.

12. The computer readable storage medium according to claim 11, wherein the method further comprises switching between canceling printing depending on type of the job data, and continuing printing while skipping processing of only error pages, if error pages are detected from among the job data.

13. The computer readable storage medium according to claim 11, wherein the method further comprises setting an operation when error pages are detected from among the job data, depending on type of the job data, based on user operation via a screen, and executing the set operation if error pages are detected.

14. The computer readable storage medium according to claim 11, wherein the method further comprises saving error information if error pages are detected from among the job data.

15. The computer readable storage medium according to claim 11, wherein the method further comprises displaying error information on a screen if error pages are detected from among the job data.

* * * * *